United States Patent
Sato

(10) Patent No.: US 10,924,681 B2
(45) Date of Patent: Feb. 16, 2021

(54) CONTROL APPARATUS, IMAGING APPARATUS, AND STORAGE MEDIUM

(71) Applicant: CANON KABUSHIKI KAISHA, Tokyo (JP)

(72) Inventor: Natsuko Sato, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/708,576

(22) Filed: Dec. 10, 2019

(65) Prior Publication Data

US 2020/0191563 A1 Jun. 18, 2020

(30) Foreign Application Priority Data

Dec. 14, 2018 (JP) .................................. 2018-234386

(51) Int. Cl.
*H04N 5/232* (2006.01)
*G01B 11/26* (2006.01)
(Continued)

(52) U.S. Cl.
CPC ......... *H04N 5/23299* (2018.08); *G01B 11/26* (2013.01); *G03B 5/06* (2013.01);
(Continued)

(58) Field of Classification Search
CPC .............. G01M 11/02; G01M 11/0221; G01M 11/0242; G01M 11/0257; G01M 11/0264;
(Continued)

(56) References Cited

U.S. PATENT DOCUMENTS 7,634,184 B2 * 12/2009 Woehler ................... G03B 5/08
348/294
7,817,205 B2 * 10/2010 Schulte .................... G03B 5/06
348/360
(Continued)

FOREIGN PATENT DOCUMENTS

| CN | 106375651 A | 2/2017 |
| JP | H11242152 A | 9/1999 |
| JP | 2017173802 A | 9/2017 |

OTHER PUBLICATIONS

Extended European Search Report issued by the European Patent Office dated May 18, 2020 in corresponding European Patent Application No. 19215933.3.

*Primary Examiner* — Gordon J Stock, Jr.
(74) *Attorney, Agent, or Firm* — Carter, DeLuca & Farrell LLP

(57) ABSTRACT

A control apparatus includes an angle control unit configured to change a tilt angle by tilting an imaging sensor, a first determination unit configured to determine a first area from among a plurality of areas in an image, an evaluation value acquisition unit configured to acquire a contrast evaluation value of each of second areas excluding the first area among the plurality of areas by changing the tilt angle through the angle control unit, and a second determination unit configured to determine the tilt angle for each area based on the contrast evaluation value acquired by the evaluation value acquisition unit, and determining the tilt angle of the image sensor based on the tilt angle determined for each area. The angle control unit tilts the image sensor so as to obtain the tilt angle determined by the second determination unit.

22 Claims, 7 Drawing Sheets

(51) Int. Cl.
*G03B 13/32* (2006.01)
*H04N 5/225* (2006.01)
*G03B 5/06* (2006.01)

(52) U.S. Cl.
CPC .......... *G03B 13/32* (2013.01); *H04N 5/2259* (2013.01); *H04N 5/23212* (2013.01); *H04N 5/232123* (2018.08); *H04N 5/232127* (2018.08); *G03B 2205/0023* (2013.01); *H04N 5/23264* (2013.01)

(58) Field of Classification Search
CPC ......... H04N 5/23299; H04N 5/232123; H04N 5/232127; H04N 5/2259; H04N 5/2253; H04N 5/23206; H04N 5/23212; H04N 5/23218; H04N 5/23264; G01B 11/26; G01B 11/272; G02B 27/0068; G02B 27/0075; G02B 7/09; G02B 2205/0023; G03B 13/30; G03B 13/32; G03B 3/02; G03B 5/04; G03B 5/06; G03B 5/08
See application file for complete search history.

(56) References Cited

U.S. PATENT DOCUMENTS

| | | | |
|---|---|---|---|
| 8,698,945 B2* | 4/2014 | Foote | G03B 5/00 348/351 |
| 10,341,567 B2* | 7/2019 | Ito | H04N 5/23212 |
| 2017/0027437 A1 | 2/2017 | Neal et al. | |
| 2017/0272658 A1 | 9/2017 | Ito | |
| 2020/0128162 A1* | 4/2020 | Takami | H04N 5/2259 |
| 2020/0137293 A1* | 4/2020 | Numata | H04N 5/232123 |
| 2020/0137313 A1* | 4/2020 | Sato | H04N 5/232127 |
| 2020/0213523 A1* | 7/2020 | Niga | H04N 5/232933 |
| 2020/0236290 A1* | 7/2020 | Kawasaki | H04N 5/232123 |
| 2020/0275032 A1* | 8/2020 | Kimura | H04N 5/2259 |
| 2020/0296296 A1* | 9/2020 | Chino | G03B 5/06 |

* cited by examiner

CONTROL APPARATUS, IMAGING APPARATUS, AND STORAGE MEDIUM

BACKGROUND OF THE INVENTION

Field of the Invention

The present invention relates to a control apparatus configured to provide a tilt control.

Description of the Related Art

In order to obtain an image with a deep depth of field, one conventionally known method (the Scheimpflug principle) adjusts a focal plane through a control (tilt control) of tilting an imaging plane relative to an imaging optical axis surface orthogonal to an imaging optical axis for imaging an object.

Japanese Patent Laid-Open No. (""JP"") 11-242152 discloses an imaging apparatus that provides a tilt control using a tilt angle calculated based on focus information obtained in a plurality of predetermined areas in an imaging area. JP 2017-173802 discloses an imaging apparatus that provides a tilt control using a tilt angle calculated based on a focus shift amount of each of a plurality of focus detection areas.

When an imaging scene contains a plane substantially orthogonal to the imaging optical axis and the tilt angle is determined based on the evaluation value acquired in that plane, the depth of field cannot be made deeper. None of the imaging apparatuses disclosed in JPs 11-242152 and 2017-173802 consider such an imaging scene, and may not be able to provide a proper tilt control.

SUMMARY OF THE INVENTION

The present invention provides a control apparatus, an imaging apparatus, and a program or storage medium capable of properly providing a tilt control.

A control apparatus according to one aspect of the present invention includes an angle control unit configured to change a tilt angle by tilting an imaging sensor relative to a plane orthogonal to an optical axis of an imaging optical system, a first determination unit configured to determine a first area from among a plurality of areas in an image, an evaluation value acquisition unit configured to acquire a contrast evaluation value of each of second areas excluding the first area among the plurality of areas by changing the tilt angle through the angle control unit, and a second determination unit configured to determine the tilt angle for each area based on the contrast evaluation value acquired by the evaluation value acquisition unit, and determining the tilt angle of the image sensor based on the tilt angle determined for each area. The angle control unit tilts the image sensor relative to the plane orthogonal to the optical axis of the imaging optical system so as to obtain the tilt angle determined by the second determination unit.

An imaging apparatus including the above control apparatus, and a non-transitory computer-readable storage medium storing a computer program that causes a computer in an imaging apparatus to execute a control method corresponding to the above control apparatus also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

Overall Configuration

Figure 1:
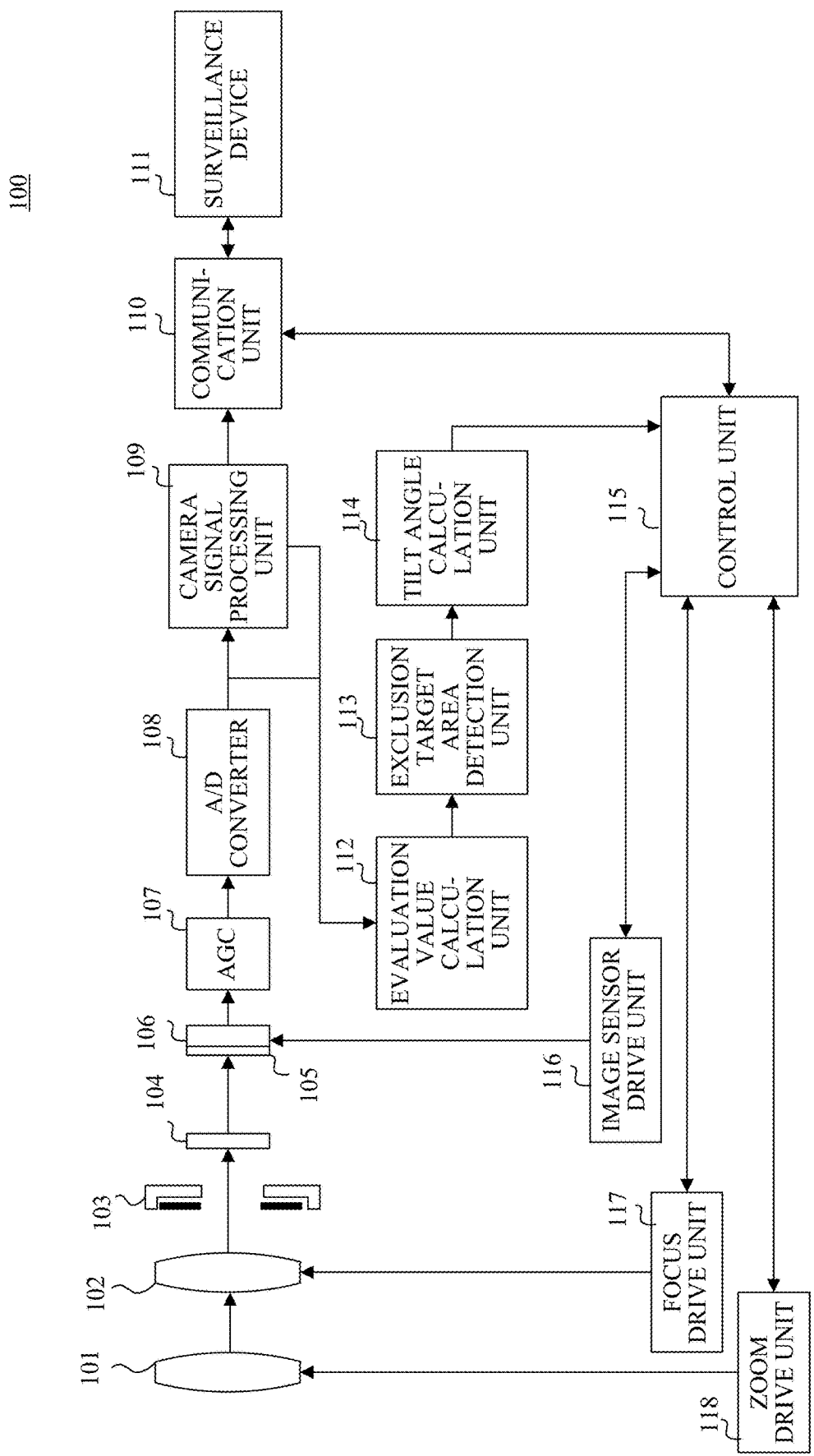
FIG. 1 is a block diagram of an imaging apparatus according to each embodiment.

Referring now to FIG. 1, a description will be given of a configuration of the imaging apparatus 100 according to this embodiment. FIG. 1 is a block diagram of the imaging apparatus 100. In this embodiment, the imaging apparatus 100 includes an imaging apparatus body and an imaging optical system (lens apparatus) that are integrally configured. However, the present invention is not limited to this embodiment, and is also applicable to an imaging system configured to include an imaging apparatus body and a lens apparatus that can be attached to and detached from the imaging apparatus body. In this case, a control unit 115 described later may be provided in either the imaging apparatus body or the lens apparatus.

A zoom lens 101 moves in an optical axis direction and changes a focal length. A focus lens 102 moves in the optical axis direction for focusing. A diaphragm unit 103 adjusts a light amount. The imaging optical system according to this embodiment includes the zoom lens 101, the focus lens 102, and the diaphragm unit 103. However, the present invention is not limited to this embodiment, and an imaging optical system that does not include at least one of the zoom lens 101, the focus lens 102, and the diaphragm unit 103 may be used.

The light that has passed through the imaging optical system forms an object image as an optical image on an image sensor 106 via a band-pass filter (BPF) 104 and a color filter 105. The BPF 104 can be inserted into and ejected from the optical path of the imaging optical system. The image sensor 106 includes a CMOS sensor and the like, photoelectrically converts the object image formed via the imaging optical system, and outputs an analog electric signal (captured image). An AGC 107 performs a gain control for the analog electrical signal output from the image sensor 106. An A/D converter 108 converts the analog electric signal into a digital signal (digital imaging signal) and outputs a digital signal to a camera signal processing unit 109.

The camera signal processing unit 109 performs various kinds of image processing for the digital imaging signal to generate an image (or video) signal. The image signal is"

output to a surveillance device 111 connected to the imaging apparatus 100 via a communication unit 110 through a wired or wireless communication. The communication unit 110 receives a command from the external device and outputs a control signal such as a command to the control unit (tilt/zoom/focus control unit) 115.

An evaluation value calculation unit 112 receives an RGB pixel value or a luminance value from the A/D converter 108 or the camera signal processing unit 109 for each of a plurality of individual areas set in the image, and calculates an contrast related evaluation value at a specific frequency used for a tilt control and a focus control. An exclusion target area detection unit 113 detects an exclusion target area (first area) based on the evaluation value of each individual area obtained by an evaluation value calculation unit 112. A tilt angle calculation unit 114 calculates a tilt angle using an evaluation value (contrast related evaluation value) obtained in an individual area (second area) other than the area detected as the exclusion target area by the exclusion target area detection unit 113. Here, the tilt angle is an angle formed between the light incident surface of the image sensor 106 and the principal plane of the imaging optical system.

Based on the instruction from the communication unit 110 and the calculation result from the tilt angle calculation unit 114, the control unit 115 instructs the tilt angle setting position, the zoom setting position, and the focus setting position to an image sensor drive unit 116, a focus drive unit 117, and a zoom drive unit 118. The image sensor drive unit 116 tilts the image sensor 106 based on the tilt angle setting position instructed from the control unit 115. In this embodiment, the control unit 115 and the image sensor drive unit 116 constitute a control unit that performs a tilt control based on the tilt angle.

Usually, an image sensor rotation axis around which the image sensor 106 is tilted is positioned at the center of the imaging screen, and the image sensor 106 is tilted about the image sensor rotation axis as a center. The focus drive unit 117 controls the position of the focus lens 102 based on the focus setting position instructed from the control unit 115. The zoom drive unit 118 controls the position of the zoom lens 101 based on the zoom setting position instructed from the control unit 115.

Figure 2:
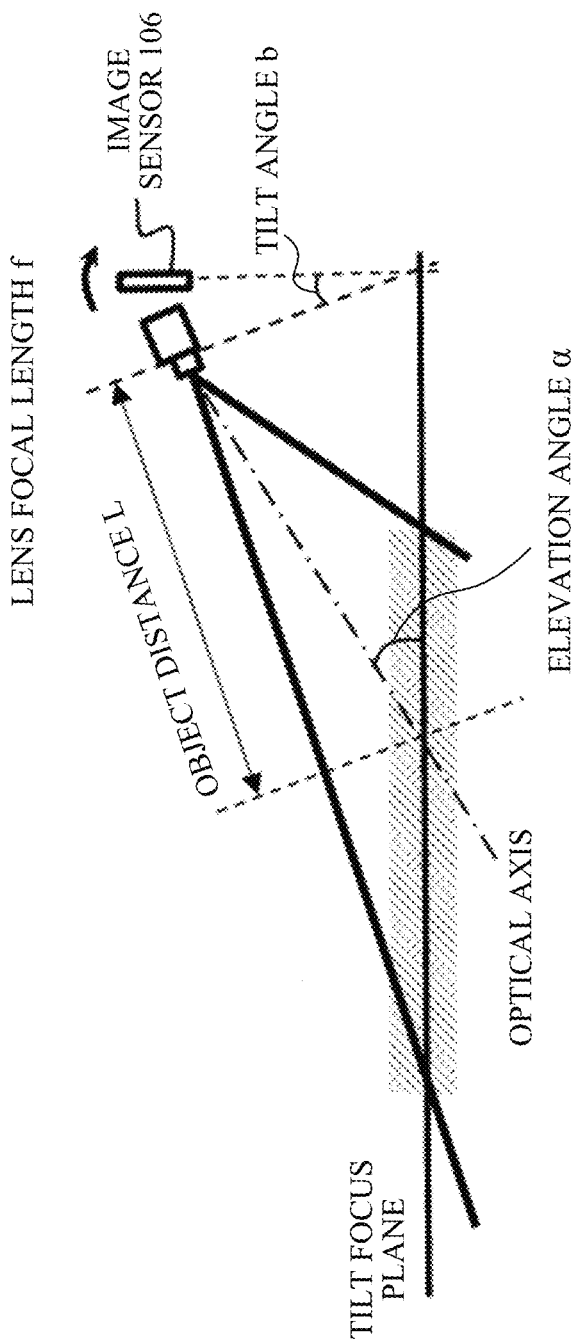
FIG. 2 explains a tilt control according to each embodiment.

The tilt control is a control that aligns the in-focus plane (focal plane) with a plane, such as the ground, by tilting the imaging plane relative to the imaging optical axis plane (optical axis orthogonal plane) orthogonal to the imaging optical axis for imaging the object (for example, by tilting the imaging optical system or the image sensor 106). The tilt control will be described with reference to FIG. 2. FIG. 2 explains the tilt control, and illustrates a state in which the image sensor 106 is tilted relative to the optical axis orthogonal plane. Thereby, with respect to a certain plane, objects from a short distance to a long distance can enter a depth of field and a focused state can be maintained. A tilt angle b is calculated by the following expression (1) based on the Scheimpflug principle using a focal length (lens focal length) f, an object distance L, and an angle (elevation angle) a between the optical axis and the focal plane.

$$b = \tan^{-1}(f/(L \tan \alpha)) \quad (1)$$

The Scheimpflug principle is a principle in which when the principal plane of the imaging optical system and the imaging plane of the image sensor 106 intersect with each other via a single straight line, the focal plane also intersects with the same straight line. Thus, when the imaging optical system and the image sensor 106 are parallel to each other, a state in which only part of the image is focused is turned into a state in which a wider area of the image is focused by tilting the imaging optical system or the image sensor 106.

FIG. 2 illustrates that when the image sensor 106 is set to a predetermined tilt angle, the in-focus area is one plane (the tilt focus plane). Thus, the area for obtaining the evaluation value in the tilt control only needs to be located within one planar area serving as the tilt focus plane. However, the tilt focus plane differs depending on the imaging scene.

Figure 3A:
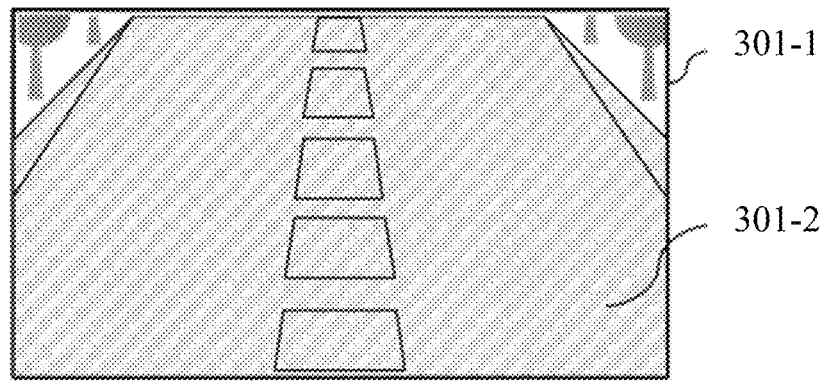
FIGS. 3A to 3C illustrate illustrative imaging scenes in which the tilt control according to each embodiment is used.
Figure 3B:
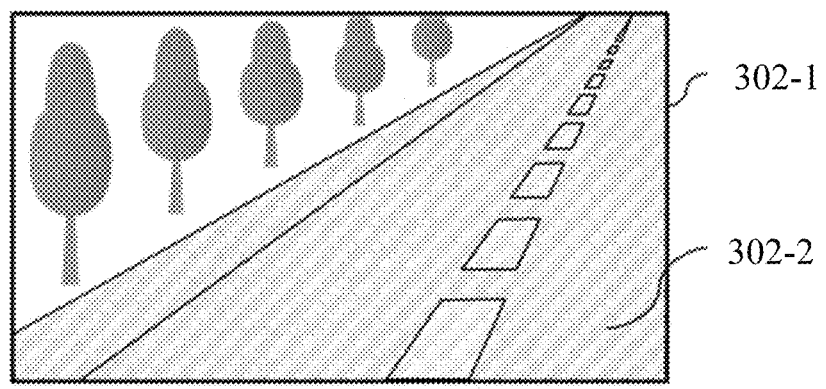
Figure 3C:
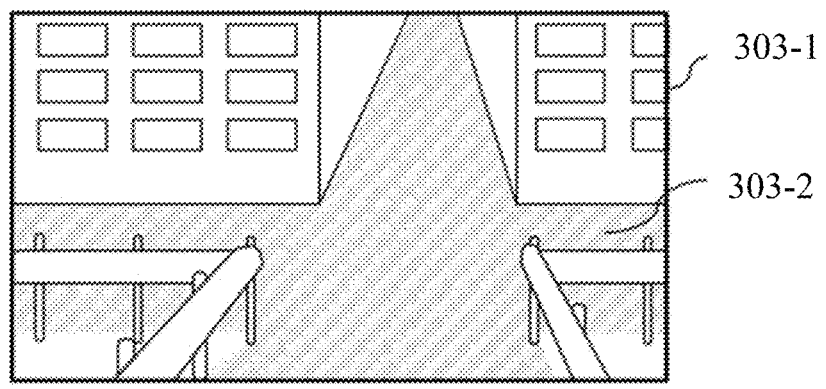

FIGS. 3A to 3C are illustrative imaging scenes for which the tilt control is used. FIGS. 3A to 3C illustrate captured images 301-1, 302-1, and 303-1 respectively. For the captured images 301-1, 302-1 and 303-1, the areas that become the tilt focus plane are hatched tilt focus planes 301-2, 302-2 and 303-2. The captured images 301-1 and 302-1 are images when the same object is captured at different angles of view. In the captured image 301-1, the tilt focus plane 301-2 occupies a wide area in the image, and the area other than upper left and right corners is suitable for obtaining the evaluation value. On the other hand, in the captured image 302-1, the tilt focus plane 302-2 is an area about half of the tilt focus surface 301-2, and if the evaluation value is acquired at the upper left, the tilt control will not be performed well.

In this way, in the imaging scenes having different angles of view, the tilt focus plane area suitable to obtain the evaluation value is different. The captured image 303-1 contains a building in the imaging scene. When the building or the like is contained in the imaging scene, the tilt focus plane is not a simple trapezoid but an area having a variety of shapes. As described above, a surface that can be focused by the tilt control is one certain plane. When the tilt control is provided for the captured image 303-1, it is necessary to consider a plane (exclusion target area) substantially orthogonal to the optical axis (imaging optical axis) of the imaging apparatus 100, such as the building. If the tilt angle is determined based on the evaluation value acquired in the exclusion target area, it is impossible to focus on the plane indicated by the tilt focus plane 303-2, and an image with a deep depth of field cannot be obtained.

Thus, for a proper tilt control according to an imaging scene, it is necessary to determine the tilt angle based on the evaluation value acquired in the area other than the area (exclusion target area) determined to be almost orthogonal to the imaging optical axis and to have few depth, unsuitable for imaging by the tilt control. A specific description will now be given of a method for determining a tilt angle based on an evaluation value acquired in an area other than the exclusion target area in an imaging scene where the exclusion target area exists like the captured image 303-1, and for providing the tilt control.

First Embodiment

Figure 4:
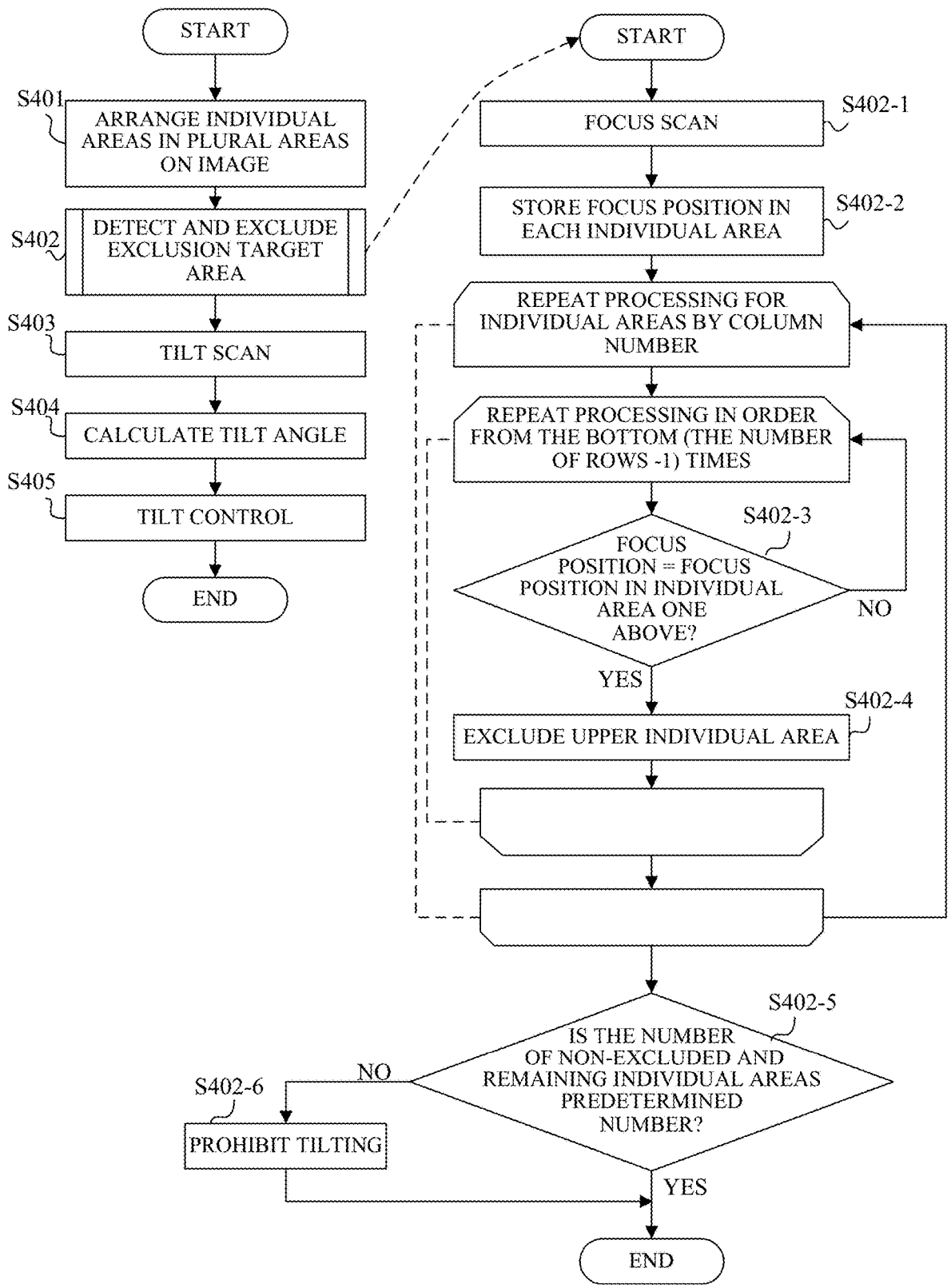
FIG. 4 is a flowchart of a tilt control according to a first embodiment.

Referring now to FIGS. 4 to 9B, a description will be given of a first embodiment according to the present invention. FIG. 4 is a flowchart of a tilt control according to this embodiment. Each step in FIG. 4 is mainly executed by the control unit 115 or by each unit of the imaging apparatus 100 based on a command from the control unit 115.

The steps S401 to S405 in FIG. 4 illustrate processing for detecting the exclusion target area existing in the imaging scene and for performing the tilt control so that the tilt angle is suitable for the tilt focus plane. Referring now to FIGS. 5 to 7B, a description will be given of a procedure of the steps S401 to S405.

Figure 5:
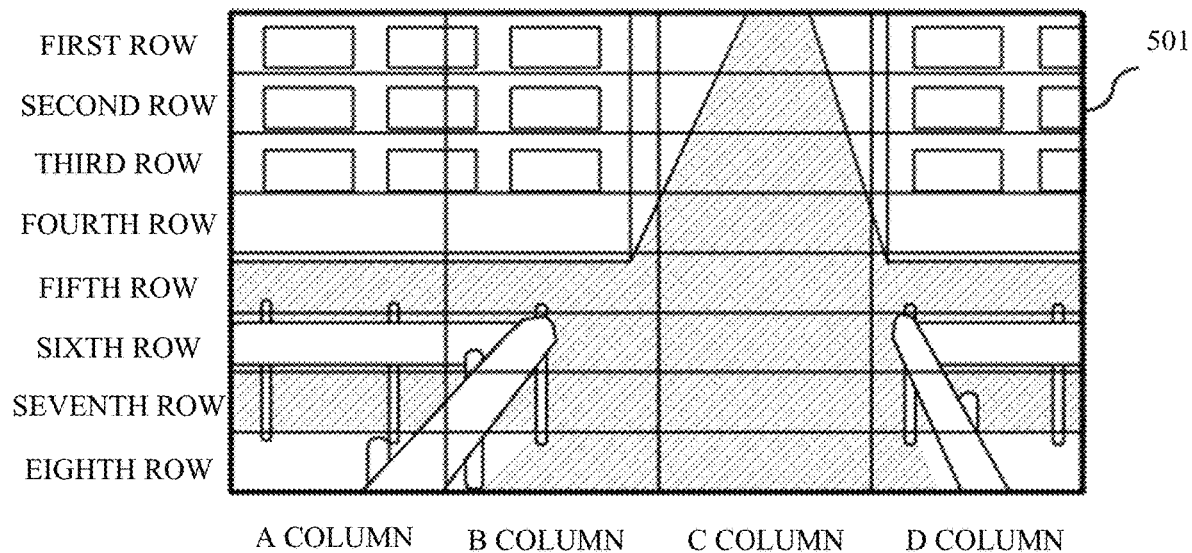
FIG. 5 illustrates individual areas used for a tilt adjustment of an image sensor according to the first embodiment.

First, in the step S401, the control unit 115 sets a plurality of individual areas in accordance with, for example, a command from a communication unit 110. FIG. 5 illustrates individual areas used to adjust the tilt of the image sensor 106. Individual areas 501 illustrated in FIG. 5 are individual areas set for the captured image 303-1 illustrated in FIG. 3C. Herein, a plurality of individual areas are set by dividing the captured image 303-1 into eight vertical rows (first to eighth rows) and four horizontal rows (A to D columns), but the dividing method is not limited to this embodiment. The individual area may be set by miniaturizing its size down to the pixel unit.

Next, in the step S402, the exclusion target area detection unit 113 detects an exclusion target area included in the imaging scene. Then, the exclusion target area detection unit 113 excludes the evaluation value obtained in the individual area corresponding to the detected exclusion target area from the evaluation value used to calculate the tilt angle. A detailed description will be given of the step S402 (steps S402-1 to S402-7) later.

Next, in the step S403, the control unit 115 performs a tilt scan. In other words, the control unit 115 controls the evaluation value calculation unit 112 and the image sensor drive unit 116, and obtains the contrast related evaluation value while changing the tilt angle of the image sensor 106 for the remaining individual area (area other than the exclusion target area) that is not excluded in the step S402. Then, the control unit 115 stores the tilt angle (optimal tilt angle) when the evaluation value is maximum in each individual area.

Figure 6:
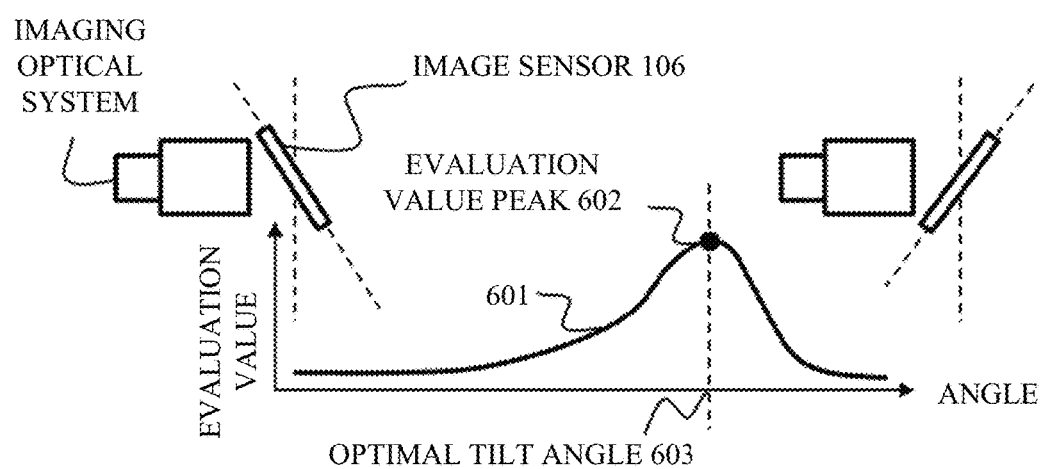
FIG. 6 schematically illustrates a tilt scan according to the first embodiment.

FIG. 6 schematically illustrates the tilt scan. The tilt scan is a control in which the evaluation value calculation unit 112 acquires a contrast related evaluation value for each individual area set in the step S402 while changing the tilt angle of the image sensor 106. An evaluation value 601 is a contrast related evaluation value obtained in a certain individual area in a certain imaging scene, and an evaluation value peak 602 is the maximum value of the evaluation value 601. In the individual area where the evaluation value 601 is obtained, the evaluation value peak 602 indicates the best focus, and the tilt angle of the image sensor 106 at that time is an optimal tilt angle 603 in the individual area.

Next, in the step S404 in FIG. 4, the tilt angle calculation unit 114 calculates the tilt angle based on the optimal tilt angle obtained in the step S403. This embodiment determines the tilt angle based on the minimum value, the maximum value, the average value of the optimal tilt angles obtained in the respective individual areas, the optimal tilt angle with an evaluation value having an absolute value higher than a predetermined value, and the optimal tilt angle in a denser range of a distribution of the optimal tilt angles than a predetermined value.

Figure 7A:
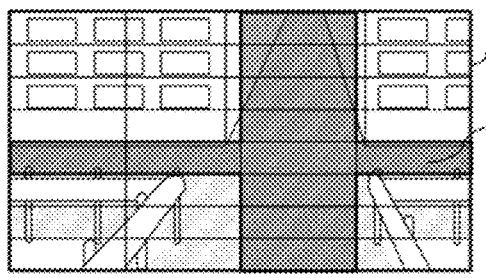
FIGS. 7A and 7B explain a calculation of a tilt angle according to the first embodiment.
Figure 7B:
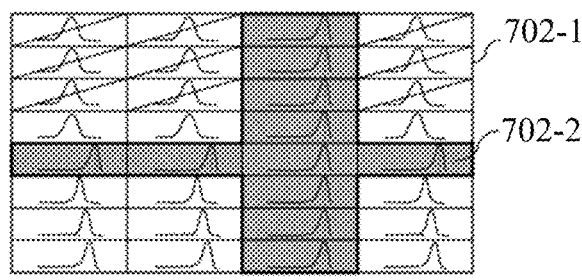

FIGS. 7A and 7B explain the way of calculating the tilt angle based on the optimal tilt angle in a dense range of the distribution of the optimal tilt angles. FIG. 7A illustrates a captured image 701-1. FIG. 7B illustrates a scan result 702-1 that is a tilt scan result of the captured image 701-1 in FIG. 7A. The individual area hatched in FIG. 7A is an area excluded from the evaluation value acquiring area for the tilt angle calculation as the exclusion target areas in the step S402. In order to calculate the tilt angle suitable for the tilt focus plane among the evaluation values obtained in the non-excluded and remaining, individual areas, an optimal tilt angle may be selected which is located in the densest range of the distribution of the optimal tilt angles in the respective individual areas. This is because the optimal tilt angles on the same plane coincide with each other in both the front and back areas. An area 702-2 having a plurality of individual areas includes a plurality of individual areas from which the optimal tilt angle is obtained within a dense range of the distribution of the optimal tilt angle, and is the area corresponding to the tilt focus plane 701-2.

Next, in the step S405 in FIG. 4, the control unit 115 provides a tilt control for driving the image sensor 106 so as to achieve the tilt angle determined (calculated) in the step S404 using the image sensor drive unit 116.

Figure 8:
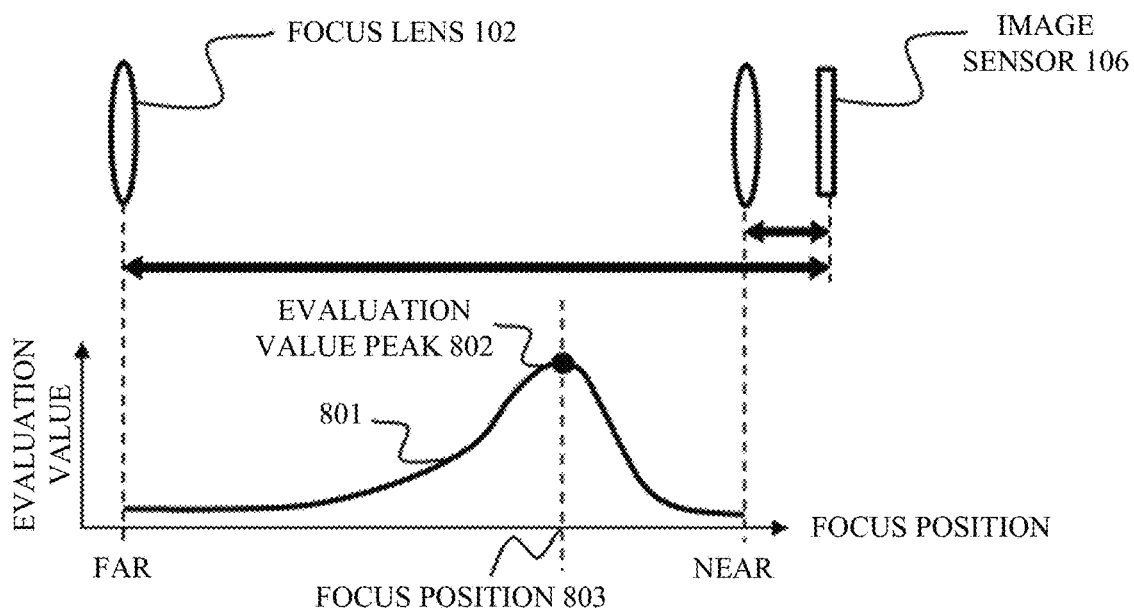
FIG. 8 schematically illustrates a focus scan according to the first embodiment.

In association with FIGS. 8, 9A, and 9B, a description will be given of the detection and exclusion method (step S402: S402-1 to S402-6) of the exclusion target area.

First, in the step S402-1, the control unit 115 performs a focus scan. FIG. 8 schematically illustrates a focus scan. The focus scan is a control in which the evaluation value calculation unit 112 acquires a contrast related evaluation value for each individual area set in the step S401 while changing the position (focus position) of the focus lens 102. An evaluation value 801 is a contrast related evaluation value obtained in a certain individual area in a certain imaging scene, and an evaluation value peak 802 is the maximum value of the evaluation value 801. In the individual area where the evaluation value 801 is obtained, the evaluation value peak 802 means the best focus, and a focus position 803 at that time is the focus position (optimal focus position) for the best focus in this individual area. The optimal focus position can be considered to be the object distance from the imaging apparatus 100 to the object existing in each individual area.

Figure 9A:
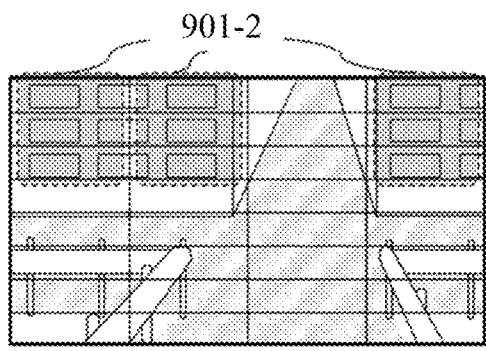
FIGS. 9A and 9B explain a focus scanning result according to the first embodiment.
Figure 9B:
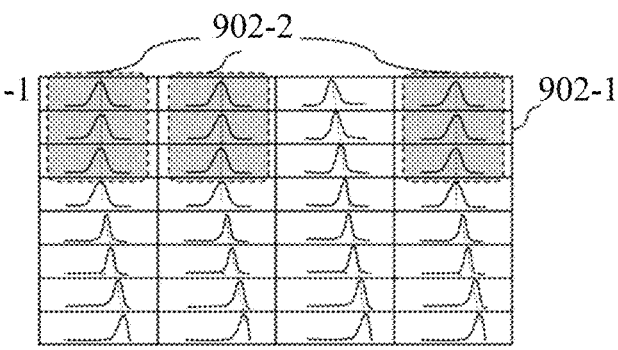

FIGS. 9A and 9B explain a focus scan result. FIG. 9A illustrates a captured image 901-1. FIG. 9B illustrates a focus scan result 902-1 that is a result of performing a focus scan in each individual area for the captured image 901-1 in FIG. 9A. The same optimal focus position is acquired in any of the individual areas 902-2 located in the exclusion target area 901-2.

Next, in the step S402-2, the exclusion target area detection unit 113 stores the optimal focus position 603 in each individual area based on the evaluation value for each individual area obtained in the step S402-1.

Next, in the step S402-3, the exclusion target area detection unit 113 makes a determination for detecting the exclusion target area based on the optimal focus position in each individual area obtained in the step S402-2. When the exclusion target area is detected, the fact that a difference in the optimal focus position between adjacent individual areas is small in the exclusion target areas is used. The exclusion target area detection unit 113 compares the optimal focus positions of the target individual area and the individual area one above in order from the lowest individual area for each column of the individual areas, and determines whether or not the difference is smaller than the difference (optimal focus position difference determination).

A description will now be given of the optimal focus position difference determination for one column using the A column as an example in the captured image illustrated in FIGS. 7A and 7B. Since the focus position difference is large between the eighth row and the seventh row, which is one row above, no processing is made, and the processing transfers to the optimal focus position difference determination between the seventh row and the sixth row. Similarly, when the optimal focus position difference determination is made for other individual areas, the optimal focus position difference between the fourth row and third row is smaller (than a predetermined difference). Among the two individual areas determined to have a small difference in this way, the upper individual area (in this case, the individual area in the third row) is excluded from the evaluation value acquiring area for the tilt control in the subsequent step S402-4, and the flow transfers to the optimal focus position difference determination of the remaining individual area again. The same processing as described above is performed for other individual area columns.

The predetermined difference can be determined based on at least one of the installation height of the imaging apparatus 100, the elevation angle, the focal length, the object distance, the size of the image sensor 106, the temperature, the humidity, and the light source of the imaging apparatus 100. While this embodiment compares the optimal focus positions of the upper and lower individual areas with each other in the tilt control in the tilt direction, the optimal focus position difference determination may be made between left and right individual areas for each row of the individual areas when the tilt control is provided in the pan direction.

Next, in the step S402-4, the control unit 115 excludes, as an area unsuitable for the evaluation value, the area determined to be the exclusion target area by the optimal focus position difference determination in the step S402-3 due to the small optimal focus position difference.

Next, in the step S402-5, the control unit 115 determines whether or not the imaging scene is suitable for imaging by the tilt control based on the number of non-excluded and remaining, individual areas in the steps S402-3 and S402-4. When the number of non-excluded and remaining, individual areas is equal to or greater than the predetermined number, the control unit 115 determines that the imaging scene is suitable for the tilt control, and transfers to processing for calculating the tilt angle for performing the tilt control (step S403). On the other hand, if the number of non-excluded and remaining, individual areas is smaller than the predetermined number, the control unit 115 determines that the imaging scene is unsuitable for imaging by the tilt control, and proceeds to the step S402-6. In the step S402-6, the control unit 115 performs processing for prohibiting the tilt control. When the exclusion target area is not detected, this embodiment may perform processing of detecting whether or not there are a plurality of planar areas having different tilts.

The above is the detection method and the exclusion method of the exclusion target area based on the evaluation value regarding the contrast. Thus, the tilt control can provide the tilt angle suitable for the tilt focus plane by setting to the exclusion target area the area that has almost no depth in the imaging scene and is less likely to have a deep depth of field in the tilt control. While this embodiment uses the optimal focus position by the focus scan as the distance information, the present invention is not limited to this embodiment and the exclusion target area may be detected based on the distance information obtained by another method such as a distance measurement sensor. Further, while this embodiment has described tilting the image sensor 106, the present invention is not limited to this embodiment and the imaging optical system may be tilted or both the image sensor 106 and the imaging optical system may be tilted so as to implement the above method.

Second Embodiment

Figure 10:
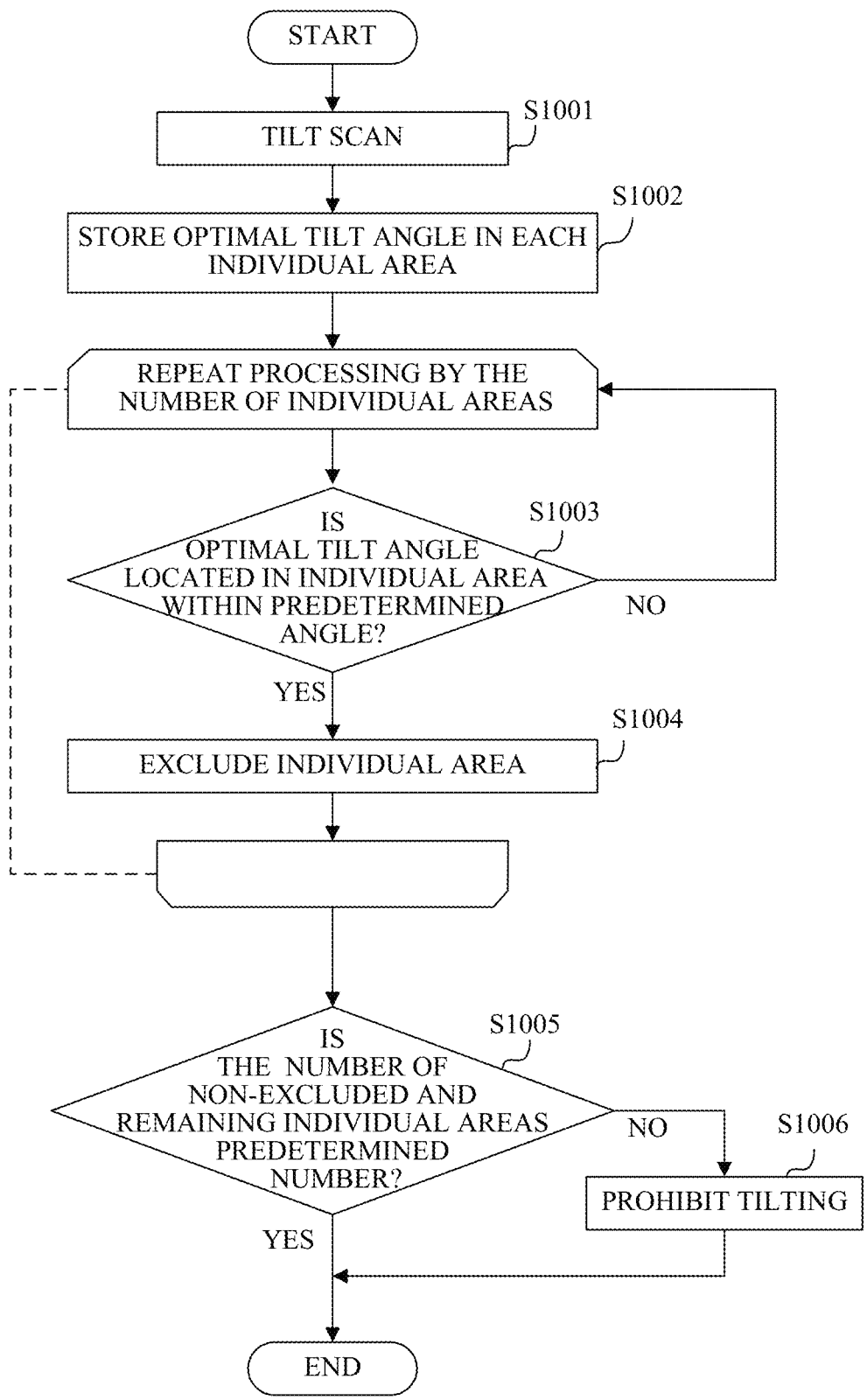
FIG. 10 is a flowchart of a tilt control according to a second embodiment.

Referring now to FIG. 10, a description will be given of a second embodiment according to the present invention. This embodiment is different from the first embodiment in the exclusion target area detection and exclusion processing in the step S402 in FIG. 4. FIG. 10 is a flowchart of the tilt control according to this embodiment. Each step in FIG. 10 is mainly executed by the control unit 115 or by each unit of the imaging apparatus 100 based on a command from the control unit 115. In this embodiment, a description common to the first embodiment will be omitted.

First, in the step S1001, the control unit 115 performs the tilt scan for each individual area set in the step S401. Next, in the step S1002, the control unit 115 (exclusion target area detection unit 113) stores the optimal tilt angle 603 in each individual area based on the evaluation value obtained in the step S1001.

Next, in the step S1003, the control unit 115 (exclusion target area detection unit 113) determines whether or not the optimal tilt angle 603 in each individual area obtained in the step S1002 belongs to an individual area having a predetermined angle. Now assume that the predetermined angle is 0 degree. This is because the individual area where the optimal tilt angle is nearly 0 degree (the image sensor 106 and the imaging optical system are substantially parallel) has few depth and is considered unsuitable for imaging by the tilt control. When the optimal tilt angle 603 obtained in the step S1002 is nearly 0 degree (in the individual area having the predetermined angle), the control unit 115 (exclusion target area detection unit 113) determines that the individual area is located in the exclusion target area and transfers to the step S1004. In the step S1004, the control unit 115 performs processing for excluding the area determined to be the exclusion target area in the step S1003 as an area that is unsuitable for obtaining the evaluation value for the tilt control.

Next, in the step S1005, the control unit 115 determines whether there is an imaging scene is suitable for imaging by the tilt control based on the number of non-excluded and remaining, individual areas in the steps S1003 and S1004. When the number of non-excluded and remaining, individual areas is equal to or larger than the predetermined number, the control unit 115 determines that the imaging scene is suitable for the tilt control, and transfers to processing for calculating the tilt angle for performing tilt control (step S403). On the other hand, if the number of non-excluded and remaining, individual areas is less than the predetermined number, the control unit 115 determines that the imaging scene is unsuitable for imaging by the tilt control, and proceeds to the step S1006. In the step S1006, the control unit 115 performs processing for prohibiting the tilt control.

While this embodiment detects an area having an optimal tilt angle that is a predetermined angle as the exclusion target area, the present invention is not limited to this embodiment. An area in which an optimal tilt angle is located within a predetermined angle range may be detected as the exclusion target area by setting a predetermined permissible range.

As described above, this embodiment can detect the exclusion target area using the tilt scan result. Since the exclusion target area is detected only by the tilt scan in this embodiment, it is unnecessary to perform the focus scan and the processing can be made faster. The detection method of the exclusion target area is not limited to the method described in each embodiment, and the exclusion target area detected by another method may be set to an unsuitable area for the evaluation value acquiring area for the tilt control.

Thus, in each embodiment, the control apparatus (imaging apparatus 100) includes a detection unit (exclusion target area detection unit 113), a calculation unit (tilt angle calculation unit 114), and a control unit (control unit 115, image sensor drive unit 116). The detection unit detects a first area (exclusion target area) from a plurality of areas in the image. The calculation unit calculates a tilt angle for a second area excluding the first area among the plurality of areas. The control unit performs a tilt control based on the tilt angle. The first area may be an area determined to be unsuitable to acquire an evaluation value (contrast related evaluation value) used for the tilt control based on a predetermined condition, and the calculation unit calculates the tilt angle based on the evaluation value obtained in the second area.

The detection unit may detect the first area based on distance information (object distance) obtained for each of the plurality of areas. The detection unit may detect the first area based on a difference in distance information between two areas adjacent to each other among the plurality of areas. The detection unit may detect at least one of the two areas as the first area when the difference in the distance information is smaller than a predetermined threshold. The predetermined threshold may be determined based on at least one of an installation height of the imaging apparatus, an elevation angle, a focal length, an object distance, a size of the imaging apparatus, a light source, a temperature, and a humidity of the imaging apparatus, and a designation by a user.

The detection unit may store, as an optimal tilt angle, a tilt angle when the evaluation value acquired while changing the tilt angle for each of the plurality of areas is the highest, and detects, as a first area, an area in which the optimal tilt angle is located within a predetermined angle range (predetermined permissible range). The predetermined angle range may be determined by at least one of a focal length, an object distance, an image sensor size, a temperature, a humidity, a light source, and a designation by a user.

The detection unit may detect whether or not there are a plurality of planar areas having different tilts or slope. The detection unit may detect, based on the distance information obtained for each of the plurality of areas, whether or not there are a plurality of adjacent areas in which the distance information continuously varies from the closest side to the infinity side, and thereby detects whether or not there are a plurality of planar areas. The detection unit may detect whether there are a plurality of tilt angles that are determined to have a dense distribution of the optimal tilt angles, based on the optimal tilt angle in each of the plurality of areas, and thereby detects whether or not a planar area exists. When there are a plurality of planar areas having different tilts, the detection unit may detect as the first area a second planar area smaller in slope (or tilt angle) than a first planar area among the plurality of planar areas. When there are a plurality of planar areas having different tilts, the detection unit may detect as the first area a planar area not selected by the user from the plurality of planar areas.

The calculation unit may calculate a tilt angle based on an optimal tilt angle in at least one of the plurality of second areas. The calculation unit may calculate the tilt angle based on at least one of an optimal tilt angle having a minimum value, a maximum value, an average value, and an evaluation value determined to have a contrast higher than a predetermined value among optimal tilt angles in the plurality of second areas or an optimal tilt angle in a range in which a distribution of the optimal tilt angles is determined to be denser than a predetermined value. When the calculation unit calculates the tilt angle based on the average value of the optimal tilt angles, the calculation unit makes heavier a weight of the optimal tilt angle in the evaluation acquiring area, as a difference becomes larger between the maximum value and the minimum value of the evaluation values acquired in the plurality of areas. When the calculation unit calculates the tilt angle based on the average value of the optimal tilt angles, the calculation unit makes heavier a weight of the optimal tilt angle in the evaluation acquiring area, as a convex shape of the evaluation values acquired in the plurality of areas is steeper.

The control unit may not perform the tilt control (or may prohibit the tilt control) when the number of first areas detected by the detection unit is equal to or larger than a predetermined number. When the target area designated by the user is detected as the first area, the control unit may perform the tilt control based on the tilt angle calculated for the target area. Each of the plurality of areas may be an area corresponding to one or more pixels in the image sensor. The first area may be an area including a plane orthogonal to the imaging optical axis. The control unit may perform the tilt control by tilting the image sensor relative to the imaging optical axis (changing an angle formed between the principal plane of the imaging optical system and the imaging plane of the image sensor 106).

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The imaging apparatus according to each embodiment can detect an exclusion target area included in an imaging scene, and perform the tilt control based on an evaluation value acquired by excluding an area that is unsuitable to acquire an evaluation value for the tilt control. Therefore, each embodiment can provide a control apparatus, an imaging apparatus, a lens apparatus, a storage medium, and a program that can properly provide a tilt control.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-234386, filed on Dec. 14, 2018, which is hereby incorporated by reference herein in its entirety.

What is claimed is:

1. A control apparatus comprising:
an angle control unit configured to change a tilt angle by tilting an imaging sensor relative to a plane orthogonal to an optical axis of an imaging optical system;
a first determination unit configured to determine a first area from among a plurality of areas in an image;
an evaluation value acquisition unit configured to acquire a contrast evaluation value of each of second areas excluding the first area among the plurality of areas by changing the tilt angle through the angle control unit; and
a second determination unit configured to determine the tilt angle for each area based on the contrast evaluation value acquired by the evaluation value acquisition unit, and determining the tilt angle of the image sensor based on the tilt angle determined for each area,
wherein the angle control unit tilts the image sensor relative to the plane orthogonal to the optical axis of the imaging optical system so as to obtain the tilt angle determined by the second determination unit, and
wherein at least one processor and circuit is configured to perform a function of at least one of the angle control unit, the first determination unit, the evaluation value acquisition unit, and the second determination unit.

2. The control apparatus according to claim 1, wherein the first determination unit determines the first area based on distance information obtained for each of the plurality of areas.

3. The control apparatus according to claim 2, wherein the first determination unit determines the first area based on a difference of the distance information between two areas adjacent to each other among the plurality of areas.

4. The control apparatus according to claim 3, wherein the first determination unit determines at least one of the two areas as the first area when the difference of the distance information is smaller than a predetermined threshold.

5. The control apparatus according to claim 4, wherein the predetermined threshold is determined based on at least one of an installation height of the imaging optical system, an elevation angle, a focal length, an object distance, a size of the image sensor, a light source, a temperature, a humidity of the imaging apparatus, and a designation by a user.

6. The control apparatus according to claim 1, wherein the first determination unit stores, as an optimal tilt angle, a tilt angle that makes highest the evaluation value acquired by changing the tilt angle for each of the plurality of areas, and
wherein the first determination unit determines as the first area an area where the optimal tilt angle is located in a predetermined angle range.

7. The control apparatus according to claim 6, wherein the predetermined angle range is determined by at least one of a focal length, an object distance, a size of the image sensor, a temperature, a humidity, light source, and a designation by a user.

8. The control apparatus according to claim 1, wherein the first determination unit determines whether or not there are a plurality of planar areas having different tilts.

9. The control apparatus according to claim 8, wherein the first determination unit determines whether or not there are the plurality of planar areas by determining whether or not there are a plurality of adjacent areas in which the distance information continuously varies from a closest side to an infinity side based on distance information obtained for each of the plurality of areas.

10. The control apparatus according to claim 8, wherein the first determination unit determines whether or not there are the plurality of planar areas by detecting whether there are a plurality of tilt angles at which a distribution of optimal tilt angles is determined to be denser than a predetermined distribution based on the optimal tilt angle in each of the plurality of areas.

11. The control apparatus according to claim 8, wherein when the plurality of planar areas includes a first planar area and a second planar area smaller in slope than the first planar area, the first determination unit determines the second planar area as the first area.

12. The control apparatus according to claim 8, wherein the first determination unit determines, as the first area, a planar area that is not selected by a user among the plurality of planar areas when there are the plurality of planar areas having different tilts.

13. The control apparatus according to claim 1, wherein the second determination unit calculates the tilt angle based on an optimal tilt angle in at least one of a plurality of second areas.

14. The control apparatus according to claim 13, wherein the second determination unit calculates the tilt angle based on at least one of an optimal tilt angle having a minimum value, a maximum value, an average value, and an evaluation value determined to have a contrast higher than a predetermined value among optimal tilt angles in the plurality of second areas or an optimal tilt angle in a range in which a distribution of the optimal tilt angles is determined to be denser than a predetermined value.

15. The control apparatus according to claim 14, wherein when the second determination unit calculates the tilt angle based on an average value of the optimal tilt angles, the second determination unit makes heavier a weight of the optimal tilt angle in an area where the evaluation value is acquired, as a difference is larger between a maximum value and a minimum value of the evaluation values acquired in the plurality of areas.

16. The control apparatus according to claim 14, wherein when the second determination unit calculates the tilt angle based on an average value of the optimal tilt angles, the second determination unit makes heavier a weight of the optimal tilt angle in an area where the evaluation value is acquired, as a convex shape the evaluation value acquired in each of the plurality of areas is steeper than a predetermined value.

17. The control apparatus according to claim 1, wherein the angle control unit does not change the tilt angle when the number of first areas detected by the first determination unit is a predetermined number or more.

18. The control apparatus according to claim 1, wherein when a target area designated by a user is determined as the first area, the angle control unit changes the tilt angle based on the tilt angle calculated for the target area.

19. The control apparatus according to claim 1, wherein each of the plurality of areas is an area corresponding to one or more pixels in the image sensor.

20. The control apparatus according to claim 1, wherein the first area is an area including a plane orthogonal to an imaging optical axis.

21. An imaging apparatus comprising:
an image sensor; and
a control apparatus,
wherein the control apparatus includes:
an angle control unit configured to change a tilt angle by tilting an imaging sensor relative to a plane orthogonal to an optical axis of an imaging optical system;
a first determination unit configured to determine a first area from among a plurality of areas in an image;

an evaluation value acquisition unit configured to acquire a contrast evaluation value of each of second areas excluding the first area among the plurality of areas by changing the tilt angle through the angle control unit; and a second determination unit configured to determine the tilt angle for each area based on the contrast evaluation value acquired by the evaluation value acquisition unit, and determining the tilt angle of the image sensor based on the tilt angle determined for each area, wherein the angle control unit tilts the image sensor relative to the plane orthogonal to the optical axis of the imaging optical system so as to obtain the tilt angle determined by the second determination unit, and wherein at least one processor and circuit is configured to perform a function of at least one of the angle control unit, the first determination unit, the evaluation value acquisition unit, and the second determination unit.

22. A non-transitory computer-readable storage medium storing a computer program that causes a computer in an imaging apparatus to execute a control method,
wherein the control method includes the steps of:
changing a tilt angle by tilting an imaging sensor relative to a plane orthogonal to an optical axis of an imaging optical system;
determining a first area from among a plurality of areas in an image;
acquiring a contrast evaluation value of each of second areas excluding the first area among the plurality of areas by changing the tilt angle; and
determining the tilt angle for each area based on the contrast evaluation value, and determining the tilt angle of the image sensor based on the tilt angle determined for each area,
wherein changing the tilt angle tilts the image sensor relative to the plane orthogonal to the optical axis of the imaging optical system so as to obtain the tilt angle.

* * * * *